United States Patent
Kim et al.

(10) Patent No.: US 10,140,677 B2
(45) Date of Patent: Nov. 27, 2018

(54) GRAPHICS PROCESSING UNIT AND DEVICE EMPLOYING TESSELLATION DECISION

(71) Applicant: Samsung Electronics Co., Ltd., Suwon-si (KR)

(72) Inventors: Seok Hoon Kim, Yongin-si (KR); Chang Hyo Yu, Yongin-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 14/823,476

(22) Filed: Aug. 11, 2015

(65) Prior Publication Data
US 2016/0155209 A1    Jun. 2, 2016

(30) Foreign Application Priority Data
Nov. 27, 2014 (KR) .................. 10-2014-0167153

(51) Int. Cl.
*G06T 1/20* (2006.01)
*G06T 17/20* (2006.01)
*G06T 1/60* (2006.01)

(52) U.S. Cl.
CPC ............. *G06T 1/20* (2013.01); *G06T 1/60* (2013.01); *G06T 17/20* (2013.01); *G06T 2200/28* (2013.01)

(58) Field of Classification Search
None
See application file for complete search history.

(56) References Cited

U.S. PATENT DOCUMENTS

| | | | |
|---|---|---|---|
| 7,102,639 B2 | 9/2006 | Oka | |
| 7,262,713 B1 | 8/2007 | Vogl et al. | |
| 7,295,204 B2 * | 11/2007 | Sfarti | G06T 17/205 345/423 |
| 7,948,500 B2 | 5/2011 | Newhall, Jr. | |
| 8,532,924 B2 | 9/2013 | Poiesz et al. | |
| 8,654,124 B2 | 2/2014 | Rohlf | |
| 2001/0013866 A1 * | 8/2001 | Migdal | G06T 17/20 345/423 |
| 2003/0210271 A1 | 11/2003 | King | |
| 2008/0055335 A1 | 3/2008 | Jung et al. | |
| 2009/0195541 A1 | 8/2009 | Peng et al. | |

(Continued)

FOREIGN PATENT DOCUMENTS

| | | |
|---|---|---|
| JP | 2010165344 | 7/2010 |
| KR | 100745768 | 7/2007 |
| KR | 100809522 | 3/2008 |

OTHER PUBLICATIONS

Patney, A., Ebeida, M., Owens, J., Parallel View-Dependent Tessellation of Catmull-Clark Subdivision Surfaces, Aug. 2009, Proceedings of the Conference on High Performance Graphcis 2009, pp. 99-108.*

*Primary Examiner* — Said Broome
(74) *Attorney, Agent, or Firm* — Onello & Mello, LLP.

(57) ABSTRACT

A graphics processing unit (GPU) for determining whether to perform tessellation on a first model according to a control of a central processing unit (CPU) is provided. The GPU reads the first model from a memory, which stores prepared models having different complexities; calculates a complexity of the first model; compares the calculated complexity with a reference complexity; and determines whether to perform a tessellation operation on the first model according to a comparison result.

16 Claims, 11 Drawing Sheets

(56) References Cited

U.S. PATENT DOCUMENTS

| | | | |
|---|---|---|---|
| 2012/0169728 A1* | 7/2012 | Mora | G06T 15/06 |
| | | | 345/419 |
| 2012/0182298 A1 | 7/2012 | Sun | |
| 2012/0313939 A1 | 12/2012 | Anttila | |
| 2013/0265309 A1* | 10/2013 | Goel | G06T 15/80 |
| | | | 345/426 |

* cited by examiner

GRAPHICS PROCESSING UNIT AND DEVICE EMPLOYING TESSELLATION DECISION

CROSS-REFERENCE TO RELATED APPLICATION

This application claims priority under 35 U.S.C. § 119(a) from Korean Patent Application No. 10-2014-0167153 filed on Nov. 27, 2014, the disclosure of which is hereby incorporated by reference in its entirety.

FIELD

Embodiments of the inventive concept relate to graphics processing, and more particularly, to a graphics processing unit (GPU) for reading one of predetermined models with different complexities and determining whether to perform a tessellation operation on the model that has been read in response to a comparison of the complexity of the read model and a reference complexity.

BACKGROUND

In computer graphics, a level of detail (LOD) involves adjusting detail based on geometry information such as depth values of control points or a curvature defined by the control points. In other words, LOD involves reducing the complexity of a three-dimensional (3D) object representation as it moves away from a viewer. LOD techniques increase the efficiency of rendering by decreasing the workload on graphics pipeline stages (e.g., vertex transformations).

Among tessellation stages in a graphics pipeline, a tessellator is expected to perform a tessellation operation on an object. Accordingly, the overhead of the tessellator increases due to computational requirements.

SUMMARY

Some embodiments of the inventive concept provide a graphics processing unit (GPU) for selecting a model from among models, which have been prepared to have different complexities before a rendering operation, according to the attributes or features of a computing device and determining whether to perform tessellation on the selected model, thereby reducing overhead of a graphics pipeline (e.g., tessellation), and devices including the same.

According to some embodiments of the inventive concept, there is provided a GPU for determining whether to perform a tessellation operation on a first model of a plurality of prepared models according to a control of a central processing unit (CPU), comprising: an access circuit configured to read the first model from a memory, the memory storing the plurality of prepared models having different complexities, the access circuit further configured to calculate a complexity of the first model, compare the calculated complexity with a reference complexity, and determine whether to perform a tessellation operation on the first model according to the comparison result.

The GPU is configured to receive a first address selected by the CPU from among addresses corresponding to memory regions of the memory storing the models, read the first model from a first memory region among the memory regions using the first address, calculate the complexity of the first model using geometry information of the first model, and determine whether to perform a tessellation operation on the first model according to the result of comparing the calculated complexity with the reference complexity. The GPU is configured to calculate the complexity of the first model in unit of object, primitive, patch, edge, vertex, or control point.

The GPU is configured to calculate the complexity of the first model based on depth values of vertices included in the primitive or a curvature defined by the vertices. The GPU is configured to calculate the complexity of the first model based on depth values of control points included in the patch or a curvature defined by the control points.

The GPU is configured to receive one or more addresses corresponding to memory regions of the memory storing the models from the CPU, estimate at least one among a bandwidth between the GPU and the memory, computing power of the GPU, maximum power consumption of the GPU, voltage and frequency determined depending on dynamic voltage frequency scaling (DVFS) of the GPU, and temperature of the GPU, select a first address from among the addresses based on an estimation result; read the first model from a first memory region among the memory regions using the selected first address, calculate the complexity of the first model using geometry information of the first model, and determine whether to perform a tessellation operation on the first model according to the result of comparing the calculated complexity with the reference complexity.

According to other embodiments of the inventive concept, there is provided a system on chip (SoC) including a GPU including a plurality of tessellation stages, a CPU, a memory accessed by the GPU, and a memory controller controlled by the CPU. The GPU is configured to read a first model from a memory, which stores a plurality of prepared models having different complexities, through the memory controller; calculate a complexity of the first model; compare the calculated complexity with a reference complexity; and determines whether to perform tessellation on the first model according to the comparison result according to a control of the CPU.

The CPU is configured to estimate at least one among a bandwidth between the GPU and the memory, computing power of the GPU, maximum power consumption of the GPU, voltage and frequency determined depending on DVFS of the GPU, and temperature of the GPU; and transmit a first address among addresses corresponding to memory regions of the memory storing the models to the GPU based on an estimation result. The GPU is configured to read the first model from a first memory region among the memory regions using the first address.

The GPU is configured to calculate the complexity using geometry information of control points of each of patches included in the first model. The geometry information may be depth values of the control points or a curvature defined by the control points. The memory storing the models before a rendering operation may be implemented inside or outside the SoC.

Alternatively, the CPU is configured to transmit addresses corresponding to memory regions of the memory storing the models to the GPU. The GPU is configured to estimate at least one among a bandwidth between the GPU and the memory, computing power of the GPU, maximum power consumption of the GPU, voltage and frequency determined depending on dynamic voltage frequency scaling (DVFS) of the GPU, and temperature of the GPU; select a first address among the addresses based on an estimation result; and read the first model from a first memory region among the memory regions using the first address.

The GPU is configured to calculate the complexity of the first model using a depth value of each of control points of each of patches included in the first model or a curvature defined by the control points.

The GPU is configured to perform the tessellation operation on the first model when the complexity of the first model is less than the reference complexity.

The tessellation stages are configured to include a hull shader, a tessellator, and a domain shader. The calculation and the comparison may be performed by the hull shader. The determination may be performed by the tessellator. The tessellator is configured to pass the first model to the domain shader or perform the tessellation operation on the first model using tessellation factors transmitted from the tessellator based on a result of the determination.

According to still other embodiments of the inventive concept, there is provided a computing device including a memory configured to store a plurality of prepared models having different complexities, a display, and a SoC configured to control the memory and the display. The SoC comprises a GPU comprising tessellation stages, a CPU, a display controller configured to control the display according to a control of the CPU, and a memory controller configured to control the memory according to the control of the CPU. The GPU is configured to read a first model from the memory storing the models through the memory controller, calculate a complexity of the first model, compare the calculated complexity with a reference complexity, and determine whether to perform a tessellation operation on the first model according to the comparison result according to the control of the CPU.

The CPU is configured to estimate at least one among a bandwidth between the GPU and the memory, computing power of the GPU, maximum power consumption of the GPU, voltage and frequency determined depending on DVFS of the GPU, and temperature of the GPU; and transmit a first address among addresses corresponding to memory regions of the memory storing the models to the GPU based on an estimation result. The GPU is configured to read the first model from a first memory region among the memory regions using the first address.

The GPU is configured to calculate the complexity of the first model in unit of object, primitive, patch, edge, vertex, or control point.

The GPU is configured to perform the tessellation operation on the first model when the complexity of the first model is less than the reference complexity.

Alternatively, the CPU is configured to transmit addresses corresponding to memory regions of the memory storing the models to the GPU. The GPU is configured to estimate at least one among a bandwidth between the GPU and the memory, computing power of the GPU, maximum power consumption of the GPU, voltage and frequency determined depending on dynamic voltage frequency scaling (DVFS) of the GPU, and temperature of the GPU; select a first address among the addresses based on an estimation result, and read the first model from a first memory region among the memory regions using the first address. The GPU is configured to perform the tessellation operation on the first model when the complexity of the first model is less than the reference complexity.

According to further embodiments of the inventive concept, there is provided an application processor including a GPU including tessellation stages, a CPU, and a memory controller controlled by the CPU. The GPU is configured to read a first model from a memory, which stores prepared models having different complexities, through the memory controller; calculate a complexity of the first model; compare the calculated complexity with a reference complexity; and determine whether to perform tessellation on the first model according to the comparison result according to a control of the CPU.

The CPU is configured to estimate at least one among a bandwidth between the GPU and the memory, computing power of the GPU, maximum power consumption of the GPU, voltage and frequency determined depending on DVFS of the GPU, and temperature of the GPU; and may transmit a first address among addresses corresponding to memory regions of the memory storing the models to the GPU based on an estimation result. The GPU is configured to read the first model from a first memory region among the memory regions using the first address.

Alternatively, the CPU is configured to transmit one or more addresses corresponding to memory regions of the memory storing the models to the GPU. The GPU is configured to estimate at least one among a bandwidth between the GPU and the memory, computing power of the GPU, maximum power consumption of the GPU, voltage and frequency determined depending on DVFS of the GPU, and temperature of the GPU, select a first address among the addresses based on an estimation result, and read the first model from a first memory region among the memory regions using the first address.

According to further embodiments of the inventive concept, there is provided a graphics processing unit (GPU) system, comprising a memory is configured to store a plurality of prepared models having different complexities; and a graphics processor is configured to read a model of the plurality of prepared models from the memory, calculate a complexity of the model, compare the calculated complexity with a reference complexity, and determine whether to perform a tessellation operation on the model in response to the comparison.

The GPU system is configured to further comprise a central processing unit (CPU) is configured to select an address of a memory region included in the memory storing the plurality of prepared models, and transmit the selected address to graphics processor, which uses to address to read the model from the memory.

The graphics processor is configured to comprise a command decoder is configured to control the GPU system according to a command received by the CPU or from the memory.

The graphics processor may comprise an access circuit is configured to read the model from the memory region using the selected address, calculate the complexity of the model using geometry information of the model, compare the complexity with the reference complexity, and determine whether to perform the tessellation operation on the model in response to the comparison.

The graphics processor may comprise one or more processing units for performing a raster operation.

BRIEF DESCRIPTION OF THE DRAWINGS

The above and other features and advantages of the inventive concept will become more apparent by describing in detail exemplary embodiments thereof with reference to the attached drawings in which.

DETAILED DESCRIPTION OF THE EMBODIMENTS

Figure 1:
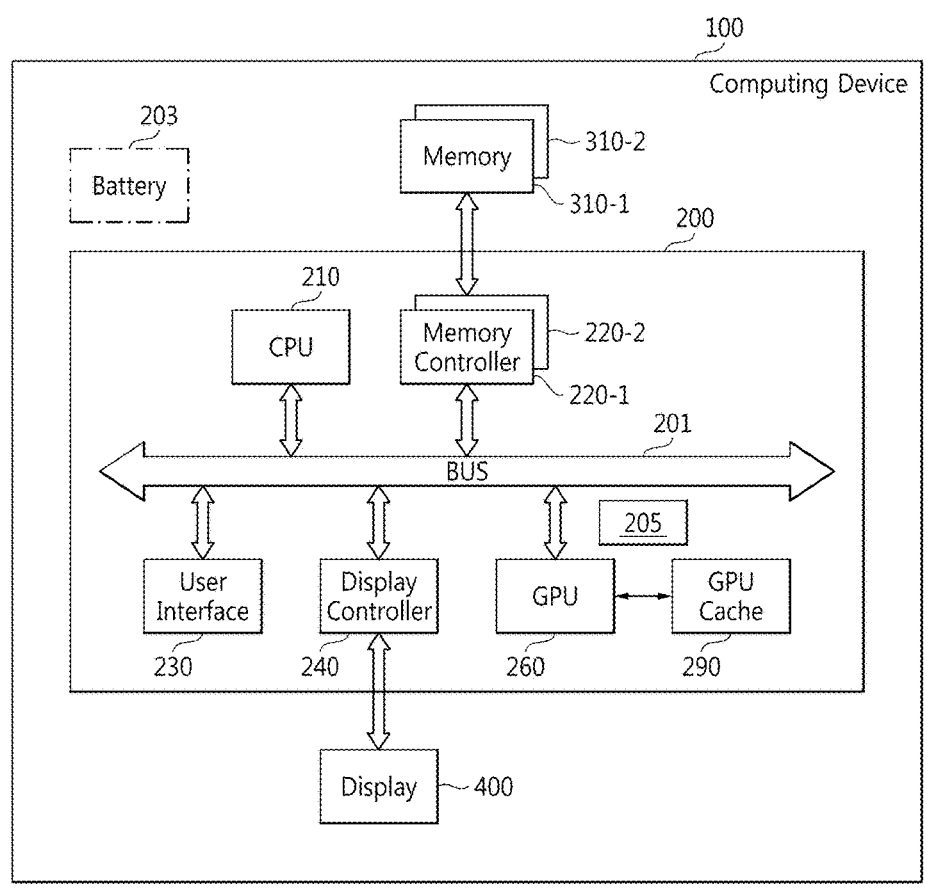
FIG. 1 is a block diagram of a computing device according to some embodiments of the inventive concept.

The inventive concept now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

In brief overview, embodiments of the present inventive concept include a coarse Level-of-Detail (LOD) geometry scheme, whereby the closest LOD geometry in a coarse LOD geometry map is selected, and a computation is made that only requires additional geometry based on the closest LOD geometry. In this manner, the same LOD geometry may be reused without redundant computations. Also, tessellation rendering overhead, widely used in current configurations, can be reduced by applying the closest LOD geometry.

FIG. 1 is a block diagram of a computing device 100 according to some embodiments of the inventive concept. The computing device 100 may be implemented in an electronic device for example, as a television (TV) (e.g., a digital TV or a smart TV), a personal computer (PC), a desktop computer, a laptop computer, a computer workstation, a tablet PC, a video game platform (or a video game console), a server, or a portable electronic device. A portable electronic device implementing embodiments may include but not be limited to a cellular phone, a smart phone, a personal digital assistant (PDA), an enterprise digital assistant (EDA), a digital still camera, a digital video camera, a portable multimedia player (PMP), a personal navigation device or portable navigation device (PND), a mobile internet device (MID), a wearable computer, an internet of things (IoT) device, an internet of everything (IoE) device, or an e-book.

The computing device 100 may include various types of devices that can process and display two-dimensional (2D) or three-dimensional (3D) graphics data. The computing device 100 includes a system on chip (SoC) 200, one or more memories 310-1 and 310-2, and a display 400.

The SoC 200 may function as a host of the computing device 100. The SoC 200 may control the overall operation of the computing device 100. For example, the SoC 200 may be replaced with an integrated circuit (IC), an application processor (AP), or a mobile AP, which can perform an operation described hereinafter in the embodiments of the inventive concept, i.e., an operation of determining whether to perform a tessellation-related operation on a model.

The SoC 200 may include a central processing unit (CPU) 210, one or more memory controllers 220-1 and 220-2, a user interface 230, a display controller 240, and a graphics processing unit (GPU) 260, also referred to as a graphics processor, which may communicate with one another via a bus 201. The bus 201 may be implemented as a peripheral component interconnect (PCI) bus, a PCI express (PCIe) bus, an advanced microcontroller bus architecture (AMBA™), an advanced high-performance bus (AHB), an advanced peripheral bus (APB), an advanced extensible interface (AXI), or a combination thereof.

The CPU 210 may control the operation of the SoC 200. According to some embodiments, the CPU 210 may estimate (i.e., calculate or measure) at least one among the attributes or features of the computing device 100, select one of addresses of memory regions included in the first memory 310-1 storing a plurality of prepared models based on the result of the estimation (i.e., calculation or measurement), and transmit the selected address to the GPU 260. The attributes or features may include at least one among a bandwidth between the GPU 260 and the memory 310-1 or 310-2, computing power of the GPU 260, maximum power consumption of the GPU 260, voltage and frequency determined depending on dynamic voltage frequency scaling (DVFS) of the GPU 260, and temperature of the GPU 260.

The SoC 200 may include a software (a firmware) component and/or a hardware component 205 which estimates (i.e., calculates or measures) at least one among the bandwidth between the GPU 260 and the memory 310-1 or 310-2, the computing power of the GPU 260, the maximum power consumption of the GPU 260, the voltage and the frequency determined depending on DVFS of the GPU 260, and the temperature of the GPU 260.

The software component may be stored in a hardware memory, and executed by one or more processors of the SoC 200, and/or one or more processors external to the SoC 200. For example, the software component may be executed by the CPU 210. At least one hardware component 205 may include at least one calculator, detector and/or sensor. The software component (e.g., an application 211 in FIG. 2) executed in the CPU 210 may estimate (i.e., calculate or measure) at least one of the attributes or features of the computing device 100 using an output signal output from the at least one hardware component 205.

The GPU 260 may receive an address from the CPU 210, read a model from one of the memory regions using the address, calculate, for example, using the access circuit 252 or another processor, a complexity of the model using geometry information of the model, compare the complexity with a reference complexity, and determine whether or not to perform tessellation on the model based on the comparison result.

Alternatively, the CPU 210 may transmit a plurality of addresses of a plurality of memory regions in the memory 310-1 or 310-2, in which a plurality of models are stored, to the GPU 260. The GPU 260 may receive the plurality of addresses from the CPU 210, estimate (i.e., calculate or measure) at least one of the attributes or features of the computing device 100, and select one of the addresses based on the estimation (i.e., calculation or measurement) result. The GPU 260 may read a model from one of the memory regions using the selected address, calculate a complexity of the model using geometry information of the model, compare the complexity with a reference complexity, and determine whether or not to perform tessellation on the model based on the comparison result.

In embodiments where the computing device 100 is a portable electronic device, the computing device 100 may also include a battery 203. The at least one hardware component 205 and/or the software component (e.g., the application 211 in FIG. 2) executed in the CPU 210 may estimate (i.e., calculate or measure) a residual value of the battery 203. In this case, at least one attribute or feature of the computing device 100 may include the residual value of the battery 203 or information about the residual value.

Figure 2:
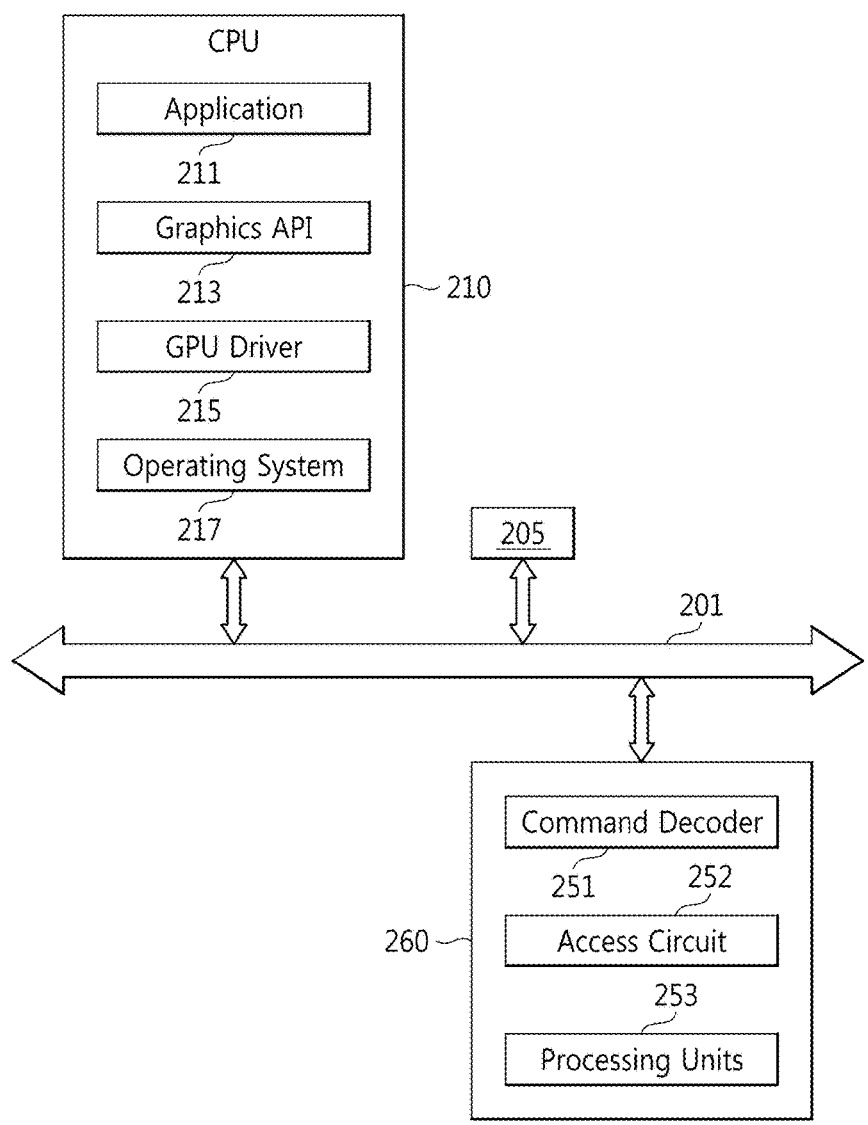
FIG. 2 is a block diagram of a central processing unit (CPU) and a graphics processing unit (GPU) illustrated in FIG. 1.

A user may enter an input into the SoC 200 through the user interface 230 so that the CPU 210 executes at least one application (e.g., the software application 211 in FIG. 2).

The at least one application executed by the CPU 210 may include an operating system (OS), a word processor application, a media player application, a video game application, and/or a graphical user interface (GUI) application.

A user may enter an input into the SoC 200 through an input device (not shown) connected to the user interface 230. For example, the input device may be implemented as a keyboard, a mouse, a microphone, or a touch pad. An application (e.g., 211 in FIG. 2) executed by the CPU 210 may include graphics rendering instructions, which may be related to a graphics application programming interface (API).

A graphics API may include one or more of an open graphics library (OpenGL®) API, open graphics library for embedded systems (Open GL ES) API, DirectX API, Renderscript API, WebGL API, or Open VG® API. To process graphics rendering instructions, the CPU 210 may transmit a graphics rendering command to the GPU 260 through the bus 201. The GPU 260 may process (or render) graphics data in response to the graphics rendering command.

The graphics data may include points, lines, triangles, quadrilaterals, patches, and/or primitives. The graphics data may also include line segments, elliptical arcs, quadratic Bezier curves, and/or cubic Bezier curves.

The one or more memory controllers 220-1 and 220-2 may read data (e.g., graphics data) from the one or more memories 310-1 and 310-2 in response to a read request from the CPU 210 or the GPU 260 and may transmit the data (e.g., the graphics data) to a corresponding element (e.g., 210, 240, or 260). The one or more memory controllers 220-1 and 220-2 may write data (e.g., graphics data) from the corresponding element (e.g., 210, 230, or 240) to the one or more memories 310-1 and 310-2 in response to a write request from the CPU 210 or the GPU 260.

The one or more memory controllers 220-1 and 220-2 are separated from the CPU 210 or the GPU 260 in the embodiments illustrated in FIG. 1. However, the one or more memory controllers 220-1 and 220-2 may be in the CPU 210, the GPU 260, or the one or more memories 310-1 and 310-2.

When the first memory 310-1 is formed with volatile memory and the second memory 310-2 is formed with non-volatile memory, the first memory controller 220-1 may be implemented to communicate with the first memory 310-1 and the second memory controller 220-1 may be implemented to be able to communicate with the second memory 310-2. The volatile memory may be a random access memory (RAM), static RAM (SRAM), dynamic RAM (DRAM), synchronous DRAM (SDRAM), thyristor RAM (T-RAM), zero capacitor RAM (Z-RAM), or twin transistor RAM (TTRAM). The non-volatile memory may be an electrically erasable programmable read-only memory (EEPROM), flash memory, magnetic RAM (MRAM), spin-transfer torque MRAM, ferroelectric RAM (FeRAM), phase-change RAM (PRAM), or resistive RAM (RRAM). The non-volatile memory may also be implemented as a multimedia card (MMC), an embedded MMC (eMMC), a universal flash storage (UFS), a solid state drive (SSD), or a universal serial bus (USB) flash drive.

The one or more memory controllers 220-1 and 220-2 may store a program (or an application) or instructions, which can be executed by the CPU 210. In addition, the one or more memory controllers 220-1 and 220-2 may store data to be used by a program executed by the CPU 210. The one or more memory controllers 220-1 and 220-2 may also store a user application and graphics data related with the user application and may store data (or information) to be used or generated by components included in the SoC 200. The one or more memory controllers 220-1 and 220-2 may store data used for the operation of the GPU 260 and/or data generated by the operation of the GPU 260. The one or more memory controllers 220-1 and 220-2 may store command streams for the process of the GPU 260.

The display controller 240 may transmit data processed by the CPU 210 or data (e.g., graphics data) processed by the GPU 260 to the display 400. The display 400 may be implemented as a monitor, a TV monitor, a projection device, a thin film transistor-liquid crystal display (TFT-LCD), a light emitting diode (LED) display, an organic LED (OLED) display, an active-matrix OLED (AMOLED) display, or a flexible display.

The display 400 may be integrated into (or embedded in) the computing device 100. The display 400 may be a screen of a portable electronic device or a stand-alone device connected to the computing device 100 through a wireless or wired communication link. Alternatively, the display 400 may be a computer monitor connected to a PC through a cable or a wired link.

The GPU 260 may receive commands from the CPU 210 and execute the commands. Commands executed by the GPU 260 may include a graphics command, a memory transfer command, a kernel execution command, a tessellation command, or a texturing command. The GPU 260 may perform graphics operations to render graphics data.

When an application executed by the CPU 210 requests to perform graphics processing, the CPU 210 may transmit graphics data and a graphics command to the GPU 260 so that the graphics data is rendered at the display 400. The graphics command may include a tessellation command and/or a texturing command. The graphics data may include vertex data, texture data, or surface data. A surface may include a parametric surface, a subdivision surface, a triangle mesh, or a curve.

The CPU 210 may transmit a graphics command and graphics data to the GPU 260 in some embodiments. In other embodiments, when the CPU 210 writes a graphics command and graphics data to the one or more memories 310-1 and 310-2, the GPU 260 may read the graphics command and the graphics data from the one or more memories 310-1 and 310-2.

The GPU 260 may directly access a GPU cache 290. Here, the GPU 260 may write or read graphics data to or from the GPU cache 290 without using the bus 201. The GPU cache 290 is an example of GPU memory that can be accessed by the GPU 260.

The GPU 260 and the GPU cache 290 are separated from each other in the embodiments illustrated in FIG. 1. In other embodiments, the GPU 260 may include the GPU cache 290. The GPU cache 290 may be formed including DRAM or SRAM, or the like. The CPU 210 or the GPU 260 may store processed (or rendered) graphics data in a frame buffer included in the one or more memories 310-1 and 310-2.

FIG. 2 is a block diagram of the CPU 210 and the GPU 260 illustrated in FIG. 1. Referring to FIG. 2, the hardware component 205, the CPU 210, and the GPU 260 may communicate with one other via the bus 201. In some embodiments, the hardware component 205, the CPU 210, and the GPU 260 may be integrated into a mother board or a SoC or may be implemented in a graphics card installed at a mother board. In a computing device 100A illustrated in FIG. 13, the hardware component 205 may be implemented in a mother board or a graphics card.

The CPU 210 may include one or more applications (e.g., software application) 211, a graphics API 213, a GPU driver 215, and an OS 217. The CPU 210 may run or execute the components 211, 213, 215, and 217.

The application 211 may include instructions for displaying graphics data and/or instructions to be executed in the GPU 260. For example, the application 211 may estimate (i.e., calculate or measure) at least one of the at least one attribute or feature of the computing device 100 and may transmit an address related with one of a plurality of models or addresses related with the plurality of models to the GPU 260 based on the estimation (i.e., calculation or measurement) result. At this time, the application 211 may use, process and/or refer an output signal of the hardware component 205.

In some embodiments, the application 211 output the instructions to the graphics API 213. The graphics API 213 may convert the instructions received from the application 211 into a format used by the GPU driver 215.

The GPU driver 215 may receive the instructions through the graphics API 213 and may control the operation of the GPU 260 so that the instructions are carried out by the GPU 260. For example, the GPU driver 215 may transmit commands to the GPU 260 through the OS 217 or may transmit the commands to the one or more memories 310-1 and 310-2 that can be accessed by the GPU 260. The GPU 260 may include a command decoder (or a command engine) 251, an access circuit 252, and one or more processing units 253.

The command decoder 251 may receive a command from the CPU 210 or a command received through the one or more memories 310-1 and 310-2 and may control the GPU 260 to execute the command, or according to the command. For example, the command decoder 251 may receive an address related with one of a plurality of models or a plurality of addresses related with the plurality of models from the CPU 210 and may transmit the address or the plurality of addresses to the access circuit 252. The access circuit 252 may read a model from the first memory 310-1 using the address transmitted from the CPU 210 or an address transmitted from one of the processing units 253 and may transmit the model that has been read to a graphics pipeline (e.g., 260A in FIG. 3).

The processing units 253 may include a programmable processing unit, a fixed-function processing unit, and an estimation unit which estimates (i.e., calculates or measures) at least one of the at least one attribute or feature of the computing device 100 and transmits the estimation result to the access circuit 252. For example, the programmable processing unit may be a programmable shader unit that can execute at least one shader program. The programmable shader unit may be downloaded from the CPU 210 to the GPU 260. Programmable shader units run in the processing units 253 may include one or more of a vertex shader unit, a hull shader unit, a domain shader unit, a geometry shader unit, a pixel shader unit (or fragment shader unit), and/or a unified shader unit.

The fixed-function processing unit may include a hardware component, for example, hardware component 205 described herein. The hardware component may be hard-wired to perform certain functions. For example, the fixed-function processing unit among the processing units 253 may include processing units that perform raster operations. For example, the processing units 253 may form a 3D graphics pipeline. For example, the 3D graphics pipeline may comply with OpenGL® API, Open GL ES API, DirectX API, Renderscript API, WebGL API, or Open VG® API.

Figure 3:
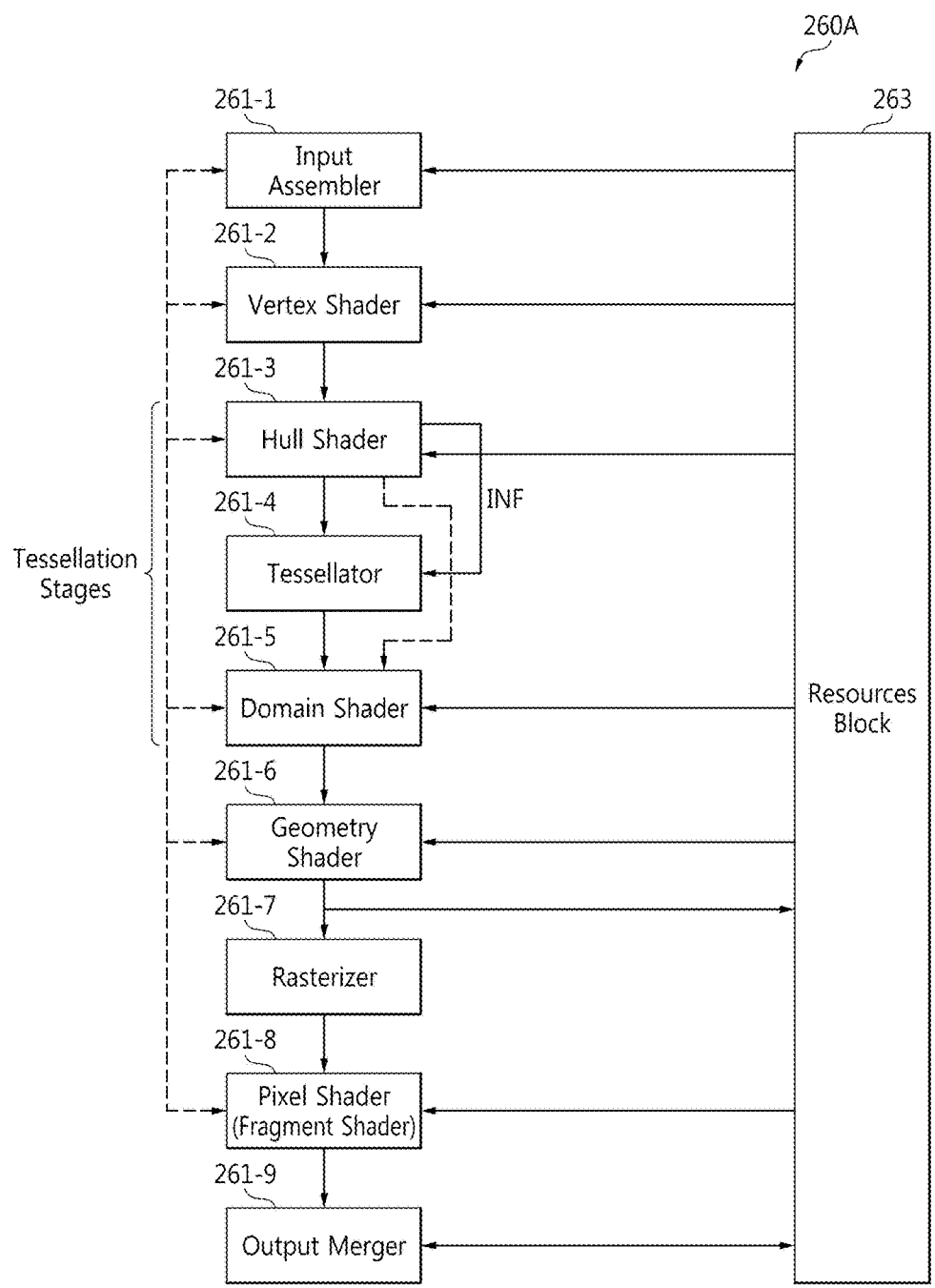
FIG. 3 is a conceptual diagram for explaining a graphics pipeline of the GPU illustrated in FIG. 1 according to some embodiments of the inventive concept.

FIG. 3 is a conceptual diagram for explaining a graphics pipeline 260A of the GPU 260 illustrated in FIG. 1 according to some embodiments of the inventive concept. The graphics pipeline 260A that can be executed in the GPU 260 may correspond to a graphics pipeline in Microsoft® DirectX 11.

The graphics pipeline 260A may include a plurality of processing stages performed at one or more processing units 253 illustrated in FIG. 2 and a resources block 263. The processing stages (or the processing units 253) may include some or all of, but not limited to, an input assembler 261-1, a vertex shader 261-2, a hull shader 261-3, a tessellator 261-4, a domain shader 261-5, a geometry shader 261-6, a rasterizer 261-7, a pixel shader 261-8, and an output merger 261-9.

The hull shader 261-3, the tessellator 261-4, and the domain shader 261-5 may form tessellation stages of the graphics pipeline 260A. Accordingly, the tessellation stages may perform tessellation (or a tessellation operation). The pixel shader 261-8 may be referred to as a fragment shader. For example, the input assembler 261-1, the tessellator 261-4, the rasterizer 261-7, and the output merger 261-9 are fixed-function stages. The vertex shader 261-2, the hull shader 261-3, the domain shader 261-5, the geometry shader 261-6, and the pixel shader 261-8 are programmable stages.

The programmable stages have a structure in which a particular kind of shader program can be executed. For example, the vertex shader 261-2 may execute a vertex shader program, the hull shader 261-3 may execute a hull shader program, the domain shader 261-5 may execute a domain shader program, the geometry shader 261-6 may execute a geometry shader program, and the pixel shader 261-8 may execute a pixel shader program. Each shader program may be executed in a shader unit of the GPU 260 at an appropriate timing.

Different shader programs may be executed in a common shader (or a common shader unit) of the GPU 260. For example, the common shader may be a unified shader. In other embodiments, at least one dedicated shader may exclusively execute at least one particular kind of shader program.

The input assembler 261-1, the vertex shader 261-2, the hull shader 261-3, the domain shader 261-5, the geometry shader 261-6, the pixel shader 261-8, and the output merger 261-9 may directly or indirectly communicate data with the resources block 263 via one or more connectors or interfaces. Accordingly, the input assembler 261-1, the vertex shader 261-2, the hull shader 261-3, the domain shader 261-5, the geometry shader 261-6, the pixel shader 261-8, and the output merger 261-9 may retrieve or receive input data from the resources block 263. The geometry shader 261-6 and the output merger 261-9 may each include an output, forwriting output data to the resources block 263.

The communication between each of the components 261-1 through 261-9 and the resources block 263 illustrated in FIG. 3 is just an example and may be modified in various ways. Therefore, apart from the operations of the components (e.g., 261-1 and 261-4) for the embodiments of the inventive concept, the operations of the components 261-1 through 261-9 are substantially the same as or similar to those of a graphics pipeline defined in Microsoft® DirectX 11. Thus, detailed descriptions therefore will be omitted.

The input assembler 261-1 provides graphics-related data (e.g., triangles, lines, and/or points) for the graphics pipeline 260A. A model read by the access circuit 252 may be provided for the input assembler 261-1. The input assembler 261-1 reads data (e.g., triangles, lines, and/or points) from the resources block 263 and assembles the data into primitives that can be used in other processing stages. The input assembler 261-1 assembles vertices into different types of primitives (e.g., line lists, triangle strips, or primitive with adjacency).

The vertex shader 261-2 processes (for example, performs transformation, skinning, morphing, and a per-vertex operation like per-vertex lighting) the assembled vertices output from the input assembler 261-1. The vertex shader 261-2 takes or operates a single input vertex and generates a single output vertex.

The hull shader 261-3 transforms input control points, which are output from the vertex shader 261-2 and define a low-order surface, into output control points that make up a patch. The hull shader 261-3 may perform per-patch calculations to provide data for the tessellator 261-4 and the domain shader 261-5.

For instance, the hull shader 261-3 may receive input control points from the vertex shader 261-2, generate output control points (that may be the same as the input control points), patch constant data, and tessellation factors regardless of the number of tessellation factors, output the output control points and the tessellation factors to the tessellator 261-4, and output the patch constant data and the tessellation factors to the domain shader 261-5 for processing.

The tessellator 261-4 may subdivide a domain (e.g., a quadrangle, a triangle, or a lint) into smaller objects (e.g., triangles, points, or lines) using the output control points and the tessellation factors. The domain shader 261-5 calculates vertex positions of the output control points output from the hull shader 261-3 and vertex positions of the subdivided points of a patch output from the tessellator 261-4.

Figure 4:
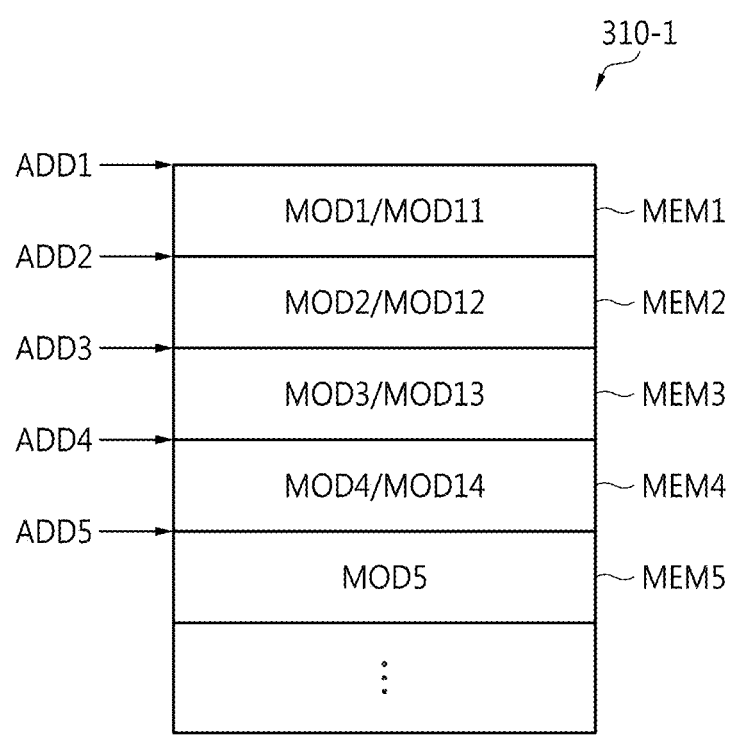
FIG. 4 is a diagram of the structure of a first memory illustrated in FIG. 1.

FIG. 4 is a diagram of the structure of the first memory 310-1 of the computing device 100 illustrated in FIG. 1. Referring to FIGS. 1 and 4, the first memory 310-1 can be accessed by the GPU 260, and include a plurality of memory regions MEM1 through MEM5. Models MOD1 through MOD5 respectively having different complexities are stored in the memory regions MEM1 through MEM5, respectively, in advance to a rendering operation. The memory regions MEM1 through MEM5 may be selected or defined by addresses ADD1 through ADD5, respectively. Here, the term "model" may be a superordinate concept to an object.

Figure 5:
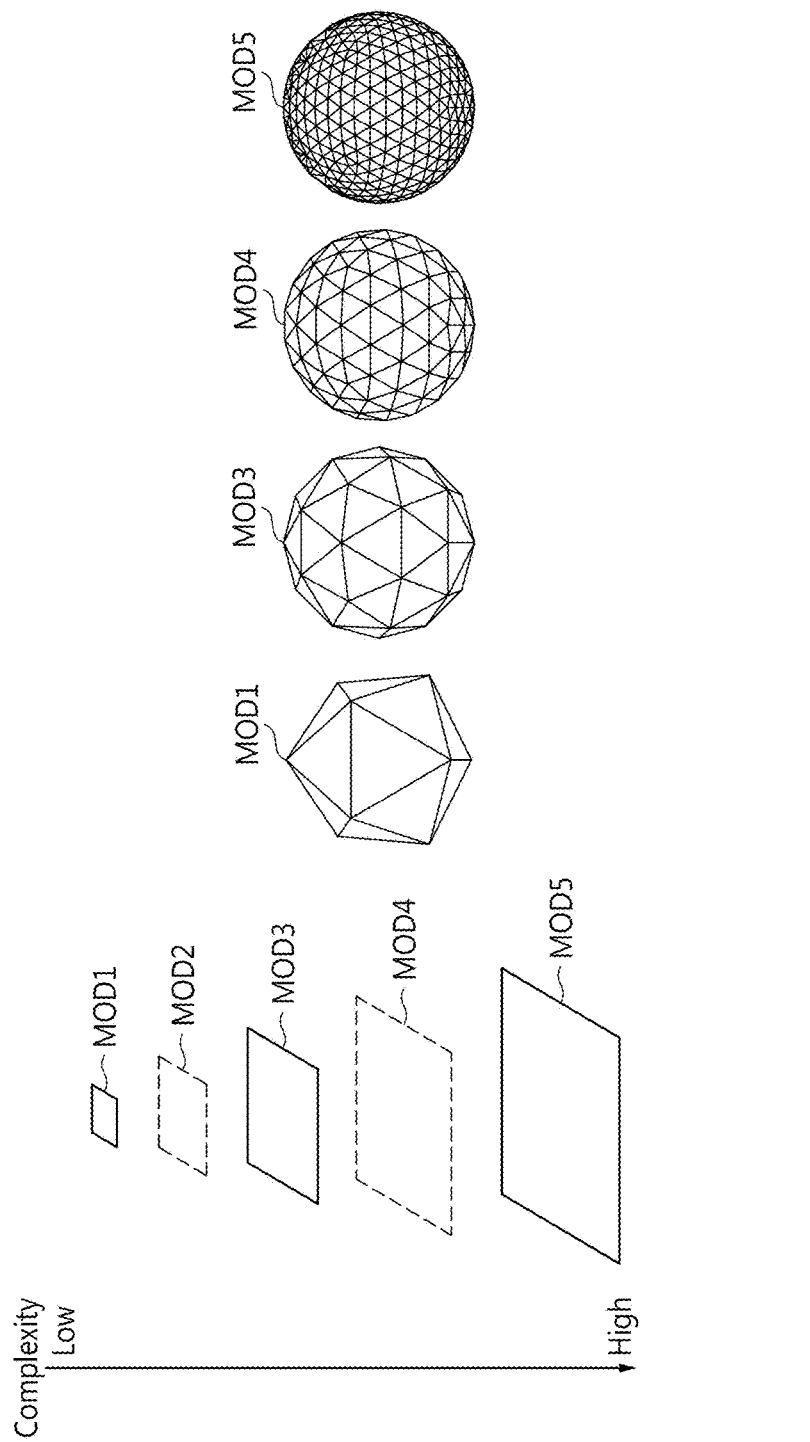
FIG. 5 is a conceptual diagram of models having different complexities.

FIG. 5 is a conceptual diagram of the models MOD1 through MOD5 having different complexities. Referring to FIGS. 4 and 5, it is assumed that the first model MOD1 has the lowest complexity and the fifth model MOD5 has the highest complexity. In other words, the complexity of the second model MOD2 is higher than that of the first model MOD1, the complexity of the third model MOD3 is higher than that of the second model MOD2, the complexity of the fourth model MOD4 is higher than that of the third model MOD3, and the complexity of the fifth model MOD5 is higher than that of the fourth model MOD4. Models MOD1-MOD5 can require various amounts of computing power, for example, required for graphics processing, and depending on the complexity.

Although five models MOD1 through MOD5 having different complexities are illustrated in FIGS. 4 and 5, these are just examples. In other embodiments, at least one model may exist between corresponding two models MOD1 and MOD2, MOD2 and MOD3, MOD3 and MOD4, or MOD4 and MOD5.

Referring to FIGS. 1 through 5, the CPU 210 may estimate (i.e., calculate or measure) at least one among one or more attributes or features of the computing device 100, select one of the addresses ADD1 through ADD5 respectively corresponding to the memory regions MEM1 through MEM5 of the first memory 310-1 storing the models MOD1 through MOD5 according to the estimation (i.e., calculation or measurement) result, and transmit the selected address to the GPU 260.

As described above, the one or more attributes or features may include the bandwidth between the GPU 260 and the memory 310-1, the computing power of the GPU 260, the maximum power consumption of the GPU 260, the voltage and the frequency determined depending on DVFS of the GPU 260, and/or the temperature of the GPU 260, and so on.

For instance, in embodiments where the computing device 100 is a desktop computer or a computer workstation, the CPU 210 may transmit the fifth address ADD5 corresponding to the fifth memory region MEM5 storing the fifth model MOD5 having the highest complexity to the GPU 260 according to the estimation (i.e., calculation or measurement) result.

However, when the computing device 100 is a portable electronic device like a smart phone, the CPU 210 may transmit the first address ADD1 corresponding to the first memory region MEM1 storing the first model MOD1 having the lowest complexity to the GPU 260 according to the estimation (i.e., calculation or measurement) result. In embodiments where the computing device 100 is a portable electronic device including a battery 203, the attributes or features of the computing device 100 may include the residual value of the battery 203, which in some embodiments may be displayed.

Accordingly, the CPU 210 may transmit the second address ADD2 corresponding to the second model MOD2 to the GPU 260 when the residual value of the battery 203 is a first value, and may transmit the first address ADD1 corresponding to the first model MOD1 to the GPU 260 when the residual value of the battery 203 is a second value. At this time, the first value may be higher than the second value.

The GPU 260 may receive the address from the CPU 210, read a model from one of the memory regions MEM1 through MEM5 using the address, calculate a complexity of the model using geometry information of the model, compare the complexity with a reference complexity, and determine whether or not to perform tessellation on the model according to the comparison result.

Alternatively, the CPU 210 may transmit a list of addresses ADD1 through ADD5 corresponding to the memory regions MEM1 through MEM5, respectively, storing the models MOD1 through MOD5, respectively, to the GPU 260. The GPU 260 may receive the addresses ADD1 through ADD5 from the CPU 210, estimate (i.e., calculate or measure) at least one among one or more attributes or features of the computing device 100, and may select one of the addresses ADD1 through ADD5 related with the models MOD1 through MOD5 according to the estimation (i.e., calculation or measurement) result.

As described above, the selected address may be transmitted to the access circuit 252. The GPU 260, and more particularly, the access circuit 252 may read a model from one of the memory regions MEM1 through MEM5 using the selected address, calculate a complexity of the model using geometry information of the model, compare the complexity with a reference complexity, and determine whether or not to perform tessellation on the model according to the comparison result.

A model that has been read using the resources block 263 may be transmitted to the input assembler 261-1. For instance, the access circuit 252 of the GPU 260 may read the model stored in a memory region corresponding to an address, which has been received from the CPU 210 or selected by the GPU 260, from the first memory 310-1 or the resources block 263 using the address.

The geometry information may include a depth value of one or more control points or a curvature defined by the control points included in the model. For instance, the hull shader 261-3, which is part of the tessellator stage of the graphics pipeline 260A, may calculate a complexity of the model using the geometry information of the model, compare the complexity with a reference complexity, and transmit comparison information INF corresponding to the comparison result to the tessellator 261-4.

The tessellator 261-4 may receive data regarding the model and the comparison information INF and determine whether to perform tessellation on the model based on the comparison information INF. In other words, the tessellator 261-4 may perform tessellation on the model, or alternatively may pass the model as it is to the domain shader 261-5.

Figure 6:
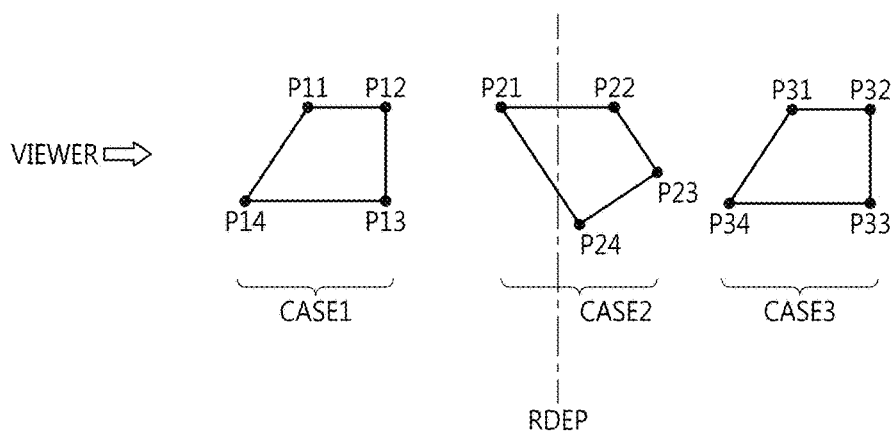
FIG. 6 is a diagram of a method of calculating a complexity of a selected model according to some embodiments of the inventive concept.

FIG. 6 is a diagram of a method of calculating a complexity of a selected model according to some embodiments of the inventive concept. The GPU 260, and more particularly, the hull shader 261-3 described herein in some embodiments may calculate the complexity of the model using geometry information, i.e., depth values of control points, of the model and may perform comparison.

The CPU 210 or the GPU 260 may generate an address that enables (or reads) a model that is closest to one desired by the computing device 100 to be read, based on the attributes of the computing device 100. Accordingly, the GPU 260 reads the model closest to the one desired by the computing device 100 from the first memory 310-1 using the address.

FIG. 6 is an exemplary conceptual diagram provided for convenience' sake in the description. Referring to a first case CASE1, when a model read by the GPU 260 includes a quadrangle patch including four control points P11, P12, P13, and P14 and the depth values of the control points P11, P12, P13, and P14 are less than a reference depth value RDEP (for example, when the patch is relatively close to a viewer), the hull shader 261-3 may transmit the comparison information INF instructing to perform tessellation on the model to the tessellator 261-4. Accordingly, the tessellator 261-4 may perform a tessellation operation on the model received from the hull shader 261-3.

However, referring to a third ease CASE3, when a model read by the GPU 260 is a quadrangle patch including four control points P31, P32, P33, and P34, and the depth values of the control points P31, P32, P33, and P34 are greater than the reference depth value RDEP (for example, when the patch is relatively far from a viewer), the hull shader 261-3 may transmit the comparison information INF instructing to pass the model to the tessellator 261-4. Accordingly, the tessellator 261-4 does not perform the tessellation on the model received from the hull shader 261-3. Since the tessellator 261-4 does not perform a tessellation operation, process-intensive overhead otherwise generated at the tessellator 261-4 is reduced. As a result, overhead of the graphics pipeline 260A is reduced.

Referring to a second case CASE2, when a model read by the GPU 260 is a quadrangle patch including four control points P21, P22, P23, and P24 and the depth value of only the control point P21 among the control points P21, P22, P23, and P24 is less than the reference depth value RDEP, then the hull shader 261-3 may transmit to the tessellator 261-4 comparison information INF instructing the tessellator 261-4 to perform a tessellation operation on the model or the comparison information INF instructing to pass the model according to a program that has been set.

As an alternative, the GPU 260 may read a model having a higher complexity than the one desired by the computing device 100. For instance, when the model desired by the computing device 100 is the first model MOD1 and the model read by the GPU 260 is the third, fourth or fifth model MOD3, MOD4, or MOD5, then the hull shader 261-3 may transmit to the tessellator 261-4 the comparison information INF instructing to pass one or more models MOD3, MOD4, or MOD5 even in any of the cases CASE1, CASE2, and CASE3.

As another alternative, the GPU 260 may read a model having a lower complexity than the one desired by the computing device 100. For instance, when the model desired by the computing device 100 is the fifth model MOD5 and the model read by the GPU 260 is the first, third, or fourth model MOD1, MOD3, or MOD4, then the hull shader 261-3 may transmit to the tessellator 261-4 the comparison information INF instructing to perform a tessellation operation on the model MOD1, MOD3, or MOD4, even in any of the abovementioned cases CASE1, CASE2, and CASE3.

Figure 7:
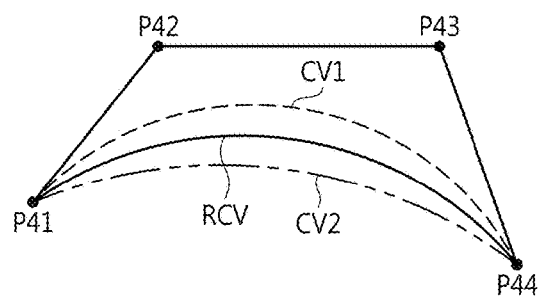
FIG. 7 is a diagram of a method of calculating a complexity of a selected model according to other embodiments of the inventive concept.

FIG. 7 is a diagram of a method of calculating a complexity of a selected model according to other embodiments of the inventive concept. Referring to FIGS. 3 through 5 and FIG. 7, the GPU 260, and more particularly, the hull shader 261-3 may calculate the complexity of the model using geometry information of the model, e.g., a curvature defined by a set of control points P41, P42, P43, and P44 and may perform a comparison.

The CPU 210 or the GPU 260 is supposed to generate an address that enables (or reads) a model closest to one desired by the computing device 100 to be read based on the attributes of the computing device 100. Accordingly, the GPU 260 reads the model closest to the one desired by the computing device 100 from the first memory 310-1 using the address.

When a curvature CV1 defined by control points P41, P42, P43, and P44 included in the model read by the GPU 260 is greater than a reference curvature RCV, the hull shader 261-3 may transmit to the tessellator 261-4 the comparison information INF instructing to perform a tessellation operation on the model. However, when a curvature CV2 defined by the control points P41, P42, P43, and P44 included in the model read by the GPU 260 is less than the reference curvature RCV, then the hull shader 261-3 may transmit to the tessellator 261-4 the comparison information INF instructing to pass the model.

Alternatively, the GPU 260 may read a model having a higher complexity than the one desired by the computing device 100. For instance, when the model desired by the computing device 100 is the first model MOD1 and the model read by the GPU 260 is the third, fourth or fifth model MOD3, MOD4, or MOD5, then the hull shader 261-3 may transmit to the tessellator 261-4 the comparison information INF instructing to pass the model MOD3, MOD4, or MOD5 regardless of the calculated curvature.

Alternatively, the GPU 260 may read a model having a lower complexity than the one desired by the computing device 100. For instance, when the model desired by the computing device 100 is the fifth model MOD5 and the model read by the GPU 260 is the first, third, or fourth model MOD1, MOD3, or MOD4, then the hull shader 261-3 may transmit to the tessellator 261-4 the comparison information INF instructing to perform a tessellation operation on at least one model MOD1, MOD3, or MOD4 regardless of the calculated curvature.

Figure 8:
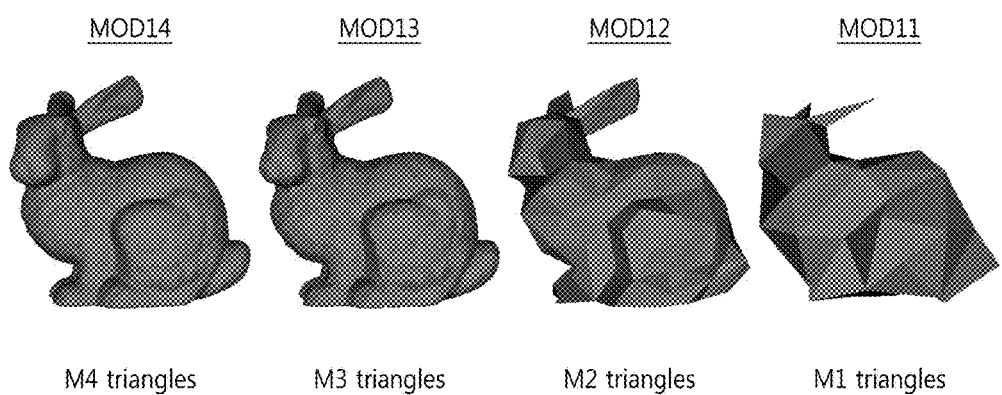
FIG. 8 is a conceptual diagram of models having different complexities.

FIG. 8 is a conceptual diagram of models MOD11, MOD12, MOD13, and MOD14 having different complexities. Referring to FIGS. 4 and 8, the models MOD11, MOD12, MOD13, and MOD14 having different complexities may be stored in the memory regions MEM1 through MEM4, respectively. One model, e.g., MOD1 or MOD11, is stored in the first memory region MEM1. One model, e.g., MOD2 or MOD12, is stored in the second memory region MEM2. One model, e.g., MOD3 or MOD13, is stored in the third memory region MEM3. One model, e.g., MOD4 or MOD14, is stored in the fourth memory region MEM4.

The number M4 of patches (e.g., triangles) included in the ninth model MOD14 is greater than the number M3 of patches (e.g., triangles) included in the eighth model MOD13. The number M3 of patches (e.g., triangles) included in the eighth model MOD13 is greater than the number M2 of the patches (e.g., triangles) included in the seventh model MOD12. The number M2 of patches (e.g., triangles) included in the seventh model MOD12 is greater than the number M1 of the patches (e.g., triangles) included in the sixth model MOD11.

Although a patch is a triangle in the embodiments illustrated in FIG. 8, the patch may be a quadrangle in other embodiments. The number of patches included in a model is related with the complexity of the model. In detail, the more the number of patches included in a model, the higher the complexity of the model. Each of the models MOD11, MOD12, MOD13, and MOD14 is transmitted to the hull shader 261-3 through the input assembler 261-1 and the vertex shader 261-2. The GPU 260, and more particularly, the access circuit 252 may read one of the models MOD11, MOD12, MOD13, and MOD14 stored in the first memory 310-1 based on an address selected by the CPU 210 or the GPU 260.

Figures 9A, 9B:
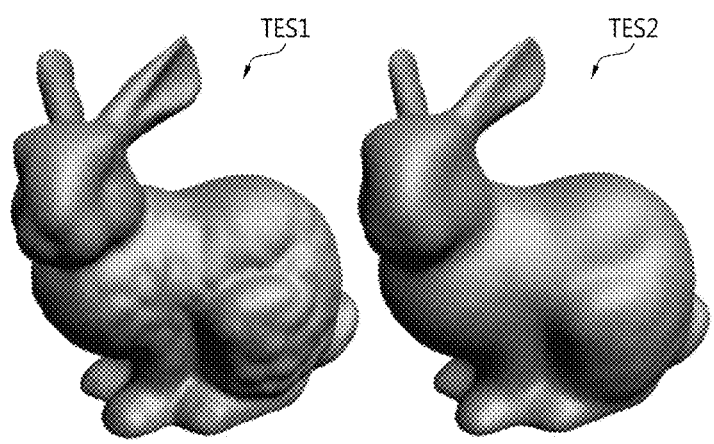
FIGS. 9A and 9B are diagrams illustrating the results of performing a tessellation operation on models having different complexities.

FIGS. 9A and 9B are diagrams illustrating the results of performing a tessellation operation on models having different complexities. An image TES1 illustrated at FIG. 9A may correspond to the ninth model MOD14 illustrated in FIG. 8. An image TES2 illustrated FIG. 9B may correspond to the sixth model MOD11 illustrated in FIG. 8.

When the model MOD11, MOD12, or MOD13 is read from the first memory 310-1 by the GPU 260, the tessellator 261-4 performs a tessellation operation on the model MOD11, MOD12, or MOD13 according to the comparison information INF received from the hull shader 261-3. At this time, the image TES1 of FIG. 9A may correspond to the model MOD11, MOD12, or MOD13 that has been tessellated.

However, when the model MOD14 is read from the first memory 310-1 by the GPU 260, the tessellator 261-4 does not perform tessellation on the model MOD14 according to the comparison information INF received from the hull shader 261-3. At this time, the image TES1 of FIG. 9A may correspond to the model MOD14 that has not been tessellated.

When the model MOD11 is read from the first memory 310-1 by the GPU 260, the tessellator 261-4 performs a tessellation operation on the model MOD11 according to the comparison information INF received from the hull shader 261-3. At this time, the image TES2 of FIG. 9B may correspond to the model MOD11 that has been tessellated.

Figure 10:
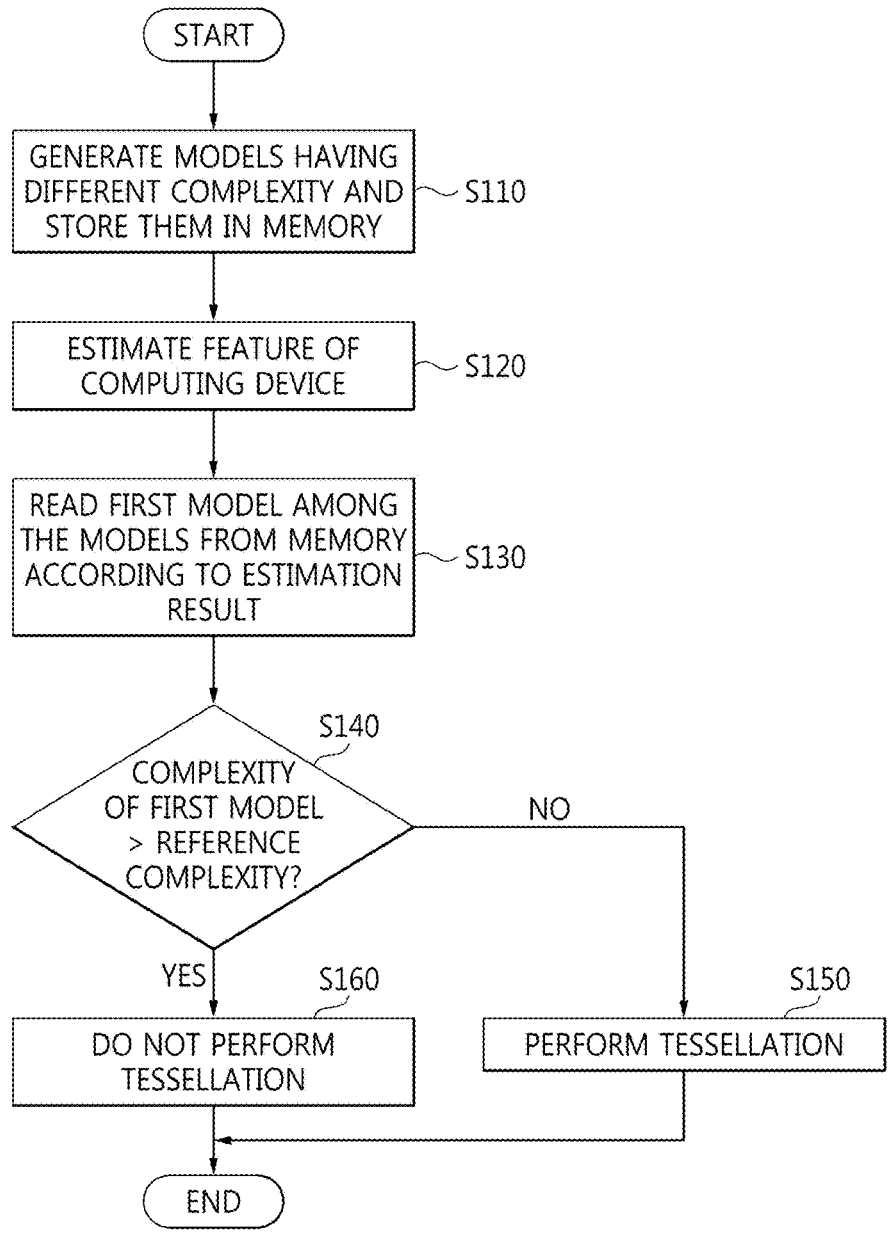
FIG. 10 is a flowchart of an operation of the computing device illustrated in FIG. 1.

FIG. 10 is a flowchart of an operation of the computing device 100 illustrated in FIG. 1. Referring to FIGS. 1 through 10, before a rendering operation, a combination of the CPU 210, the GPU 260, and/or a modeler generates a plurality of the models MOD1 through MOD5 or MOD11 through MOD14 having different complexities, and store the models MOD1 through MOD5 or MOD11 through MOD14 in a memory that can be accessed by the GPU 260 in operation S110. The CPU 210 or the GPU 260 estimates at least one of the attributes or features of the computing device 100 in operation S120.

The GPU 260, and more particularly, the access circuit 252 reads one of the models MOD1 through MOD5 or MOD11 through MOD14 from the memory using an address (i.e., the estimation result) selected by the CPU 210 or the GPU 260 in operation S130. The model that has been read is provided for the graphics pipeline 260A.

The graphics pipeline 260A, and more particularly, a tessellation stage (e.g., the hull shader 261-3) calculates a complexity of the model based on geometry information of the model and compares the calculated complexity with a reference complexity in operation S140. The calculated complexity and the reference complexity may be defined by depth values of control points of a patch, for example, a triangle, polygon, geometric primitive, and so on included in the model or a curvature defined by the control points. The hull shader 261-3 may calculate the complexity of the model in unit of an object, primitive, patch, edge, vertex, or control point.

When the calculated complexity is determined to be less than the reference complexity, that is, when tessellation of the model is required, then the hull shader 261-3 transmits to the tessellator 261-4 the comparison information INF instructing to perform a tessellation operation. At this time, the hull shader 261-3 may transmit the model and tessellation factors for the tessellation to the tessellator 261-4. The tessellator 261-4 performs the tessellation operation on the model in operation S150.

However, when the calculated complexity is greater than the reference complexity, that is, when tessellation of the model is not required, then the hull shader 261-3 transmits to the tessellator 261-4 the comparison information INF instructing to pass the model without tessellation. The tessellator 261-4 does not perform a tessellation operation on the model in operation S160.

Figure 11:
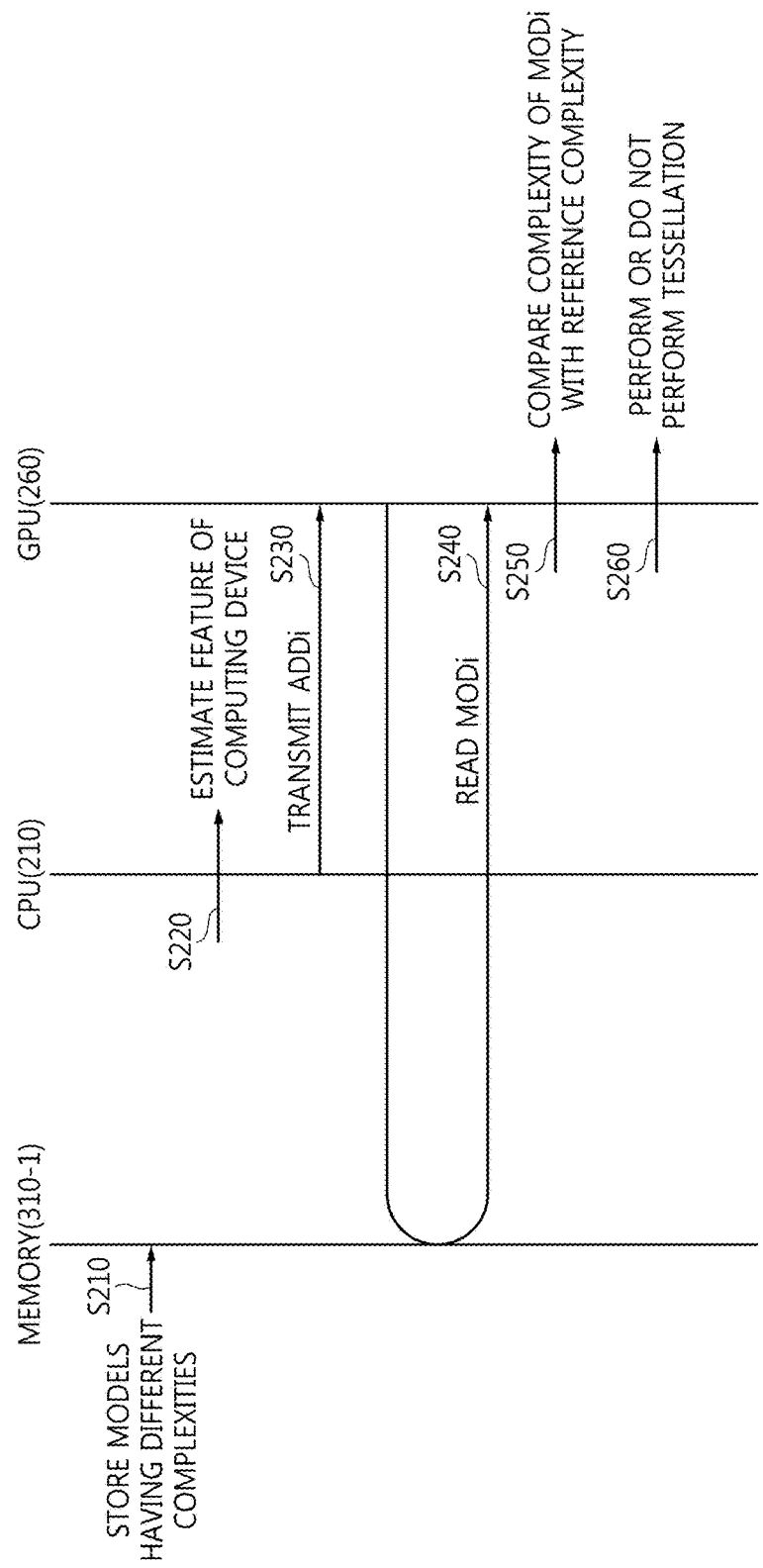
FIG. 11 is a diagram of a method of selecting a model from among models having different complexities according to some embodiments of the inventive concept.

FIG. 11 is a diagram of a method of selecting a model from among models having different complexities according to some embodiments of the inventive concept. Some or all of the method can be performed at a hardware device, for example, the CPU 210 and/or the GPU 260 described herein. In the embodiments illustrated in FIG. 11, the CPU 210 estimates the attributes or features of the computing device 100. Referring to FIGS. 1 through 7 and FIG. 11, before a rendering operation, in operation S210, the CPU 210, the GPU 260, or a modeler generates a plurality of the models MOD1 through MOD5 having different complexities and stores the models MOD1 through MOD5 in the first memory 310-1 that can be accessed by the GPU 260.

The CPU 210 estimates (i.e., calculates or measures) at least one among the attributes or features of the computing device 100 in operation S220. As shown in FIGS. 2, 4 and 5, the CPU 210 transmits an address (e.g., ADDi where $1 \leq i \leq 5$) among the addresses ADD1 through ADD5 corresponding to the memory regions MEM1 through MEM5 respectively storing the models MOD1 through MOD5 to the GPU 260 according to the estimation (i.e., calculation or measurement) result in operation S230.

The GPU 260 receives the address ADDi from the CPU 210 and reads a model MODi from one of the memory regions MEM1 through MEM5 using the address ADDi in operation S240. The GPU 260 calculates a complexity of the model MODi using geometry information related to the model MODi and compares the calculated complexity with a reference complexity in operation S250.

The GPU 260 may determine whether to perform a tessellation operation on the model MODi according to the comparison result in operation S260. In other words, the tessellator 261-4 may or may not perform the tessellation operation on the model MODi according to the comparison information INF in operation S260.

Figure 12:
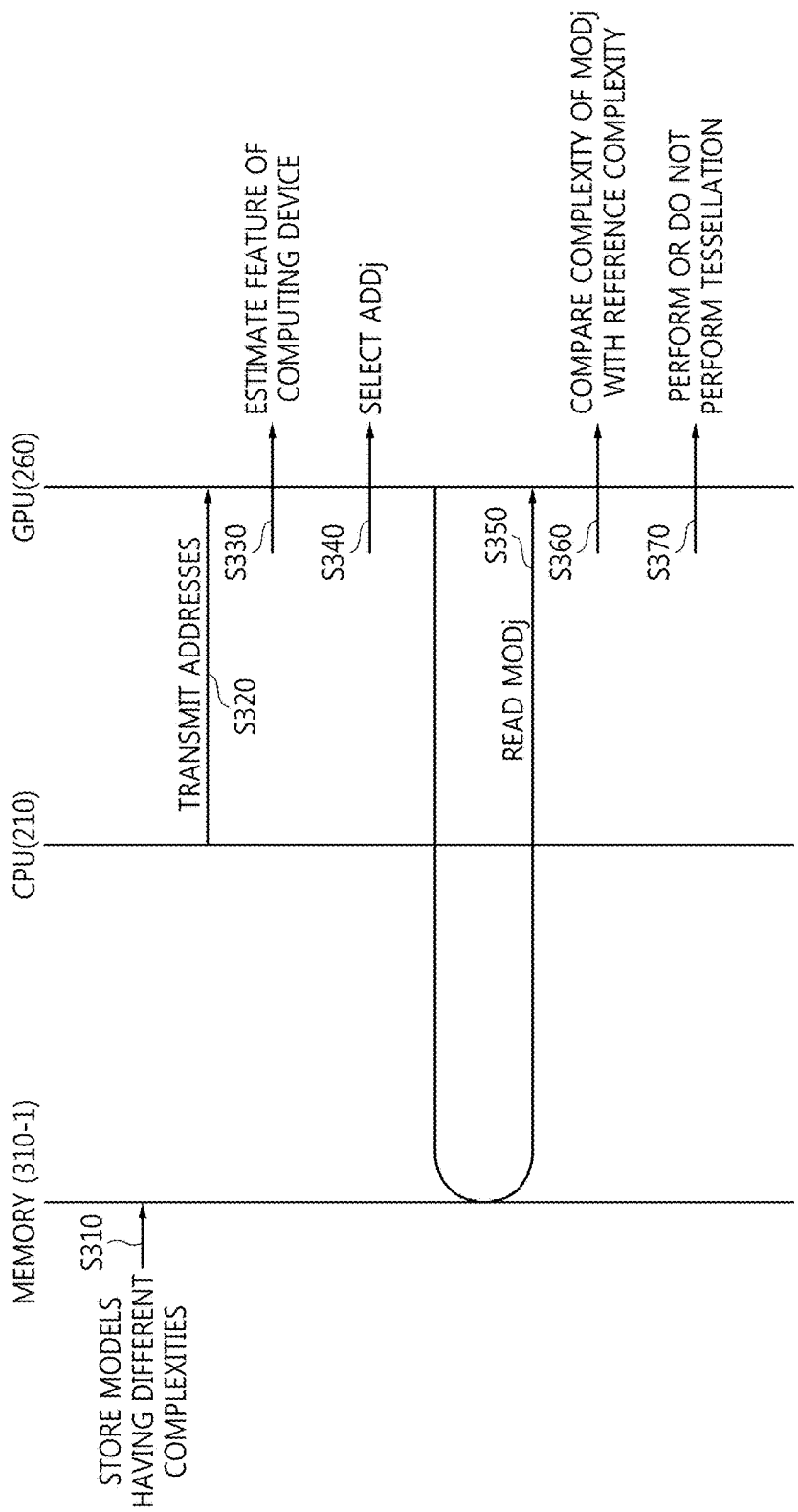
FIG. 12 is a diagram of a method of selecting a model from among models having different complexities according to other embodiments of the inventive concept.

FIG. 12 is a diagram of a method of selecting a model from among models having different complexities according to other embodiments of the inventive concept. In the embodiments illustrated in FIG. 12, the GPU 260 estimates the attributes or features of the computing device 100. Referring to FIGS. 1 through 7 and FIG. 12, before a rendering operation, in operation S310, the CPU 210, the GPU 260, or a modeler generates a plurality of the models MOD1 through MOD5 having different complexities and stores the models MOD1 through MOD5 in the first memory 310-1 that can be accessed by the GPU 260.

The CPU 210 may transmit a plurality of the addresses ADD1 through ADD5 corresponding to the memory regions MEM1 through MEM5 storing the models MOD1 through MOD5 to the GPU 260 in operation S320. The GPU 260 receives the addresses ADD1 through ADD5 from the CPU 210 and estimates (i.e., calculates or measures) at least one among the attributes or features of the computing device 100 in operation S330.

The GPU 260 selects an address (e.g., ADDj where $1 \leq j \leq 5$) among the addresses ADD1 through ADD5 according to the estimation (i.e., calculation or measurement) result in operation S340 and reads a model MODj from one of the memory regions MEM1 through MEM5 using the selected address ADDj in operation S350. The GPU 260 calculates a complexity of the model MODj using geometry information related to the model MODj and compares the calculated complexity with a reference complexity in operation S360.

The GPU 260 may determine whether to perform a tessellation operation on the model MODj according to the comparison result in operation S370. In other words, the tessellator 261-4 may or may not perform the tessellation operation on the model MODj according to the comparison information INF in operation S370.

Figure 13:
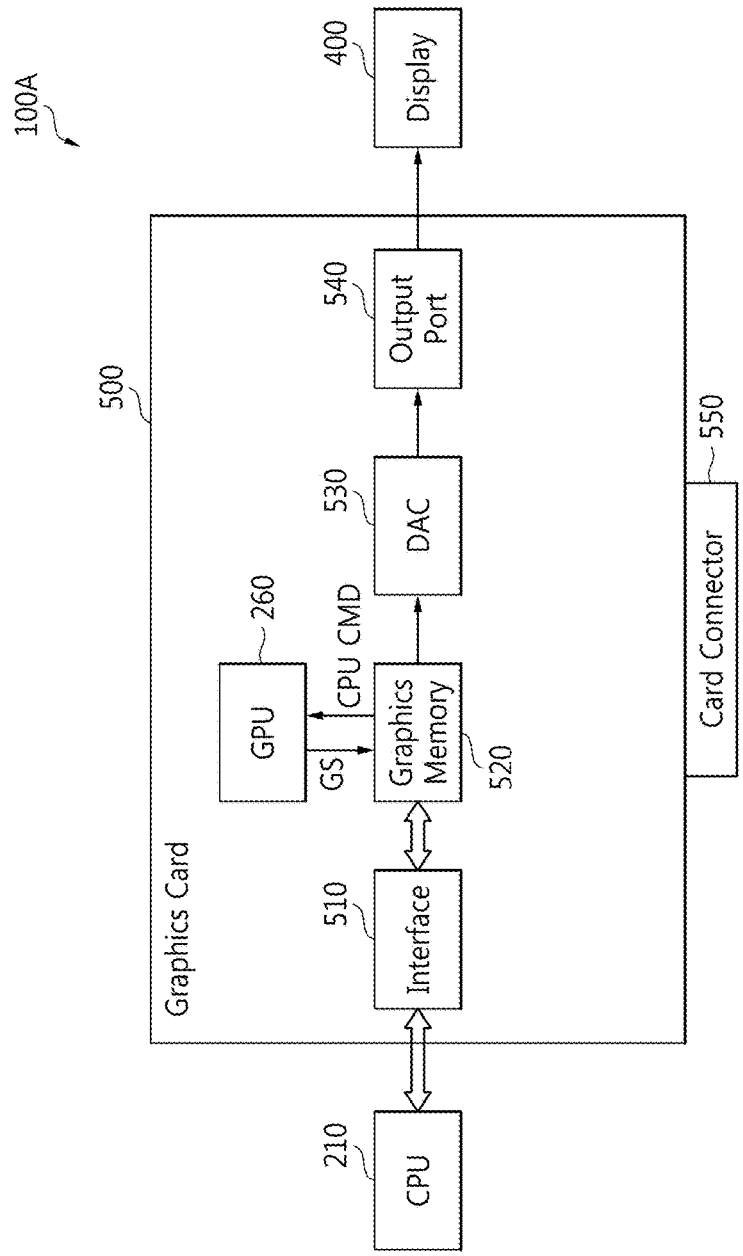
FIG. 13 is a block diagram of a computing device including a graphics card according to some embodiments of the inventive concept.

FIG. 13 is a block diagram of a computing device 100A including a graphics card 500 according to some embodiments of the inventive concept. Referring to FIG. 13, the computing device 100A may include the CPU 210, the graphics card 500, and the display 400. The computing device 100A may be a TV (e.g., a digital TV or a smart TV), a PC, a desktop computer, a laptop computer, a computer workstation, or a computing device using the graphics card 500.

The graphics card 500 includes the GPU 260, an interface 510, a graphics memory 520, a digital-to-analog converter (DAC) 530, an output port 540, and a card connector 550. The interface 510 may transmit a command and/or data from the CPU 210 to the graphics memory 520 or may transmit information about the graphics card 500 to the CPU 210. The graphics memory 520 may store data generated by the GPU 260 and may transmit a command from the CPU 210 to the GPU 260.

In association with the CPU 210, the GPU 260 performs one or more of the operations described with reference to FIGS. 1 through 12. Data generated in the GPU 260 is transmitted to the graphics memory 520.

The DAC 530 converts digital signals into analog signals. The output port 540 transmits the analog signals, i.e., image signals from the DAC 530 to the display 400. The card connector 550 is inserted into a slot of a main board including the CPU 210.

According to some embodiments of the inventive concept, a GPU determines whether or not to perform tessellation on a model selected from among prepared models, thereby reducing the overhead of a graphics pipeline (i.e., tessellation). In addition, the GPU stores models having different complexities in memory in advance to a rendering operation, selects one of the models according to the feature of a computing device, and determines whether or not to perform tessellation on the selected model, thereby reducing the overhead of the graphics pipeline (i.e., tessellation).

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A computing device, comprising:
a graphics processing unit (GPU);
a central processing unit (CPU);
a memory, wherein the memory is operable to store a plurality of prepared models of an object, the prepared models having different complexities, an access circuit is operable to read a selected model from the memory, the selected model selected from among the plurality of prepared models according to an attribute of the computing device;
wherein the GPU is operable to calculate a complexity of the selected model, to compare the calculated complexity with a reference complexity, and to perform a tessellation operation on the selected model if the complexity of the selected model is less than that of the reference complexity, and
wherein the GPU is operable to receive one or more addresses corresponding to memory regions of the memory storing the models from the CPU, and to estimate at least one among: a bandwidth between the GPU and the memory, computing power of the GPU, maximum power consumption of the GPU, voltage and frequency determined depending on dynamic voltage frequency scaling (DVFS) of the GPU, and temperature of the GPU;
to select a first address from among the addresses based on an estimation result;
to read the selected model from a first memory region among the memory regions using the selected first address; and
to calculate the complexity of the selected model using geometry information of the selected model, and to determine whether to perform the tessellation operation on the selected model according to the result of comparing the calculated complexity with the reference complexity.

2. The computing device of claim 1, wherein the GPU is operable to calculate the complexity of the selected model in unit of one of object, primitive, patch, edge, vertex, and control point.

3. The computing device of claim 2, wherein the GPU is operable to calculate the complexity of the selected model based on depth values of vertices included in the primitive or a curvature defined by the vertices.

4. The computing device of claim 2, wherein the GPU is operable to calculate the complexity of the selected model based on depth values of control points included in the patch or a curvature defined by the control points.

5. A system on chip (SoC) comprising:
a graphics processing unit (GPU) including a plurality of tessellation stages;
a central processing unit (CPU);
a memory accessed by the GPU; and
a memory controller controlled by the CPU,
wherein the GPU is operable to read a selected model of an object from the memory the model selected from among a plurality of prepared models of different complexities of the object according to an attribute of the SoC, through the memory controller, to perform a calculation by calculating a complexity of the selected model of the object, to perform a comparison by comparing the calculated complexity with a reference complexity to produce a comparison result, and to perform tessellation on the selected model if the determination is that the complexity of the selected model of the object is less than that of the reference complexity, and
wherein the CPU is operable to determine the attribute of the Soc by estimating at least one among: a bandwidth between the GPU and the memory, computing power of the GPU, maximum power consumption of the GPU, voltage and frequency determined depending on dynamic voltage frequency scaling (DVFS) of the GPU, and temperature of the GPU to produce an estimation result; and to transmit an address among addresses corresponding to memory regions of the memory storing the models to the GPU based on the estimation result, and the GPU is operable to read the selected model from a memory region among the memory regions using the address.

6. The SoC of claim 5, wherein the GPU is operable to calculate the complexity using geometry information of control points of each of patches included in the selected model.

7. The SoC of claim 6, wherein the geometry information is depth values of the control points or a curvature defined by the control points.

8. The SoC of claim 5, wherein the memory storing the models before a rendering operation is implemented outside the SoC.

9. The SoC of claim 5, wherein the GPU is operable to calculate the complexity of the selected model using a depth value of each of control points of each of patches included in the selected model or a curvature defined by the control points.

10. The SoC of claim 9, wherein the SoC is operable to perform tessellation on the first model when the complexity of the selected model is less than the reference complexity.

11. The SoC of claim 5, wherein the tessellation stages comprise:
a hull shader;
a tessellator; and
a domain shader,
wherein the calculation and the comparison are performed by the hull shader, the determination is performed by the tessellator, and
wherein the tessellator is operable to pass the selected model to the domain shader or perform tessellation on the selected model using tessellation factors transmitted from the tessellator based on a result of the determination.

12. A graphics processing unit (GPU) system, comprising:
a memory operable to store a plurality of prepared models of an object, the models having different complexities; and
a graphics processor operable to read a selected model of the object from among the plurality of prepared models from the memory, to perform a calculation by calculating a complexity of the model of the object, to perform a comparison by comparing the calculated complexity with a reference complexity to produce a comparison result, and to perform a determination by determining whether to perform a tessellation operation on the selected model of the object in response to the comparison result, wherein the selected model of the object is selected according to an attribute of a computing device with which the GPU is associated,
wherein the graphics processor is operable to receive one or more addresses corresponding to memory regions of the memory storing the models, and to estimate at least one among: a bandwidth between the graphics processor and the memory, computing power of the graphics processor, maximum power consumption of the graphics processor, voltage and frequency determined depending on dynamic voltage frequency scaling (DVFS) of the graphics processor, and temperature of the graphics processor;
to select a first address from among the addresses based on an estimation result;
to read the selected model from a first memory region among the memory regions using the selected first address; and
to calculate the complexity of the selected model using geometry information of the selected model, and to determine whether to perform the tessellation operation on the selected model according to the result of comparing the calculated complexity with the reference complexity.

13. The GPU system of claim 12, further comprising a central processing unit (CPU) operable to transmit the one or more addresses corresponding to memory regions of the memory storing the models to the GPU.

14. The GPU system of claim 13, wherein the graphics processor comprises a command decoder that controls the GPU system according to a command received from the CPU or from the memory.

15. The GPU system of claim 13, wherein the graphics processor comprises an access circuit operable to read the model from the memory region using the selected address, calculate the complexity of the model using geometry information of the model, compare the complexity with the reference complexity, and determine whether to perform the tessellation operation on the model in response to the comparison result.

16. The GPU system of claim 13, wherein the graphics processor comprises one or more processing units for performing a raster operation.

* * * * *